March 1, 1966 R. W. SAUMSIEGLE ETAL 3,237,243
APPARATUS FOR MAKING PLASTIC CONTAINERS
Original Filed Sept. 11, 1961 3 Sheets-Sheet 1

INVENTORS
ROBERT W. SAUMSIEGLE
FRED E. WILEY

BY Cushman, Darby & Cushman
ATTORNEYS

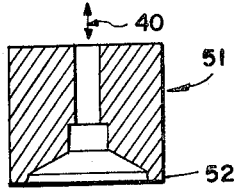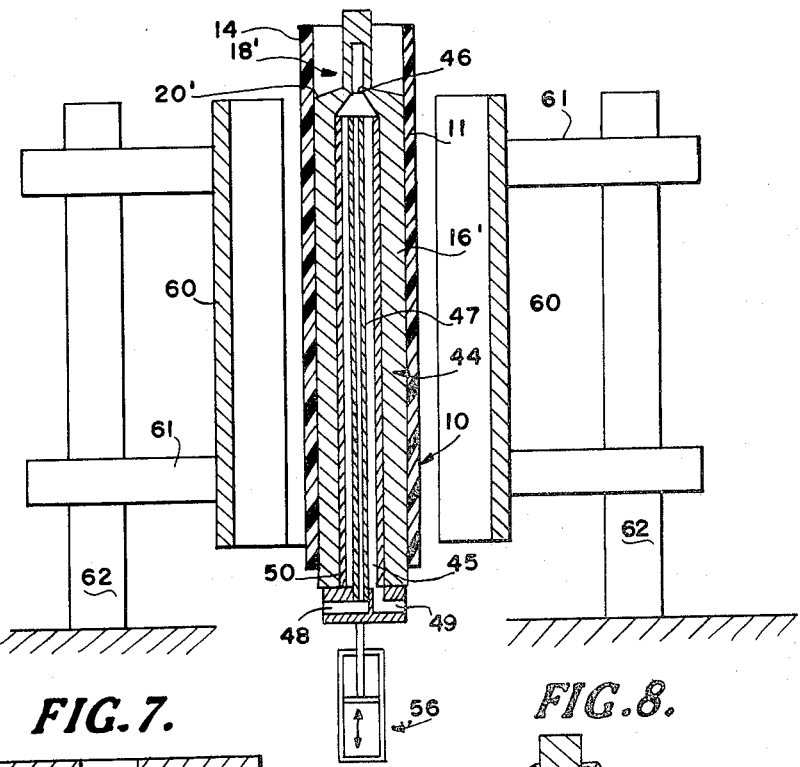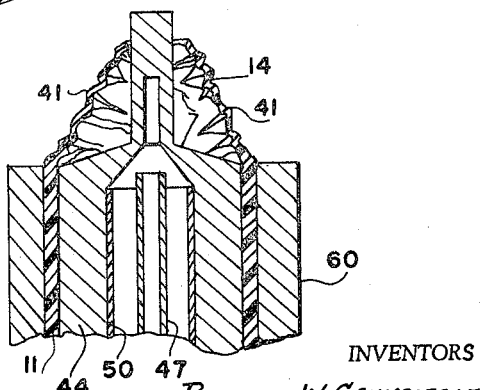

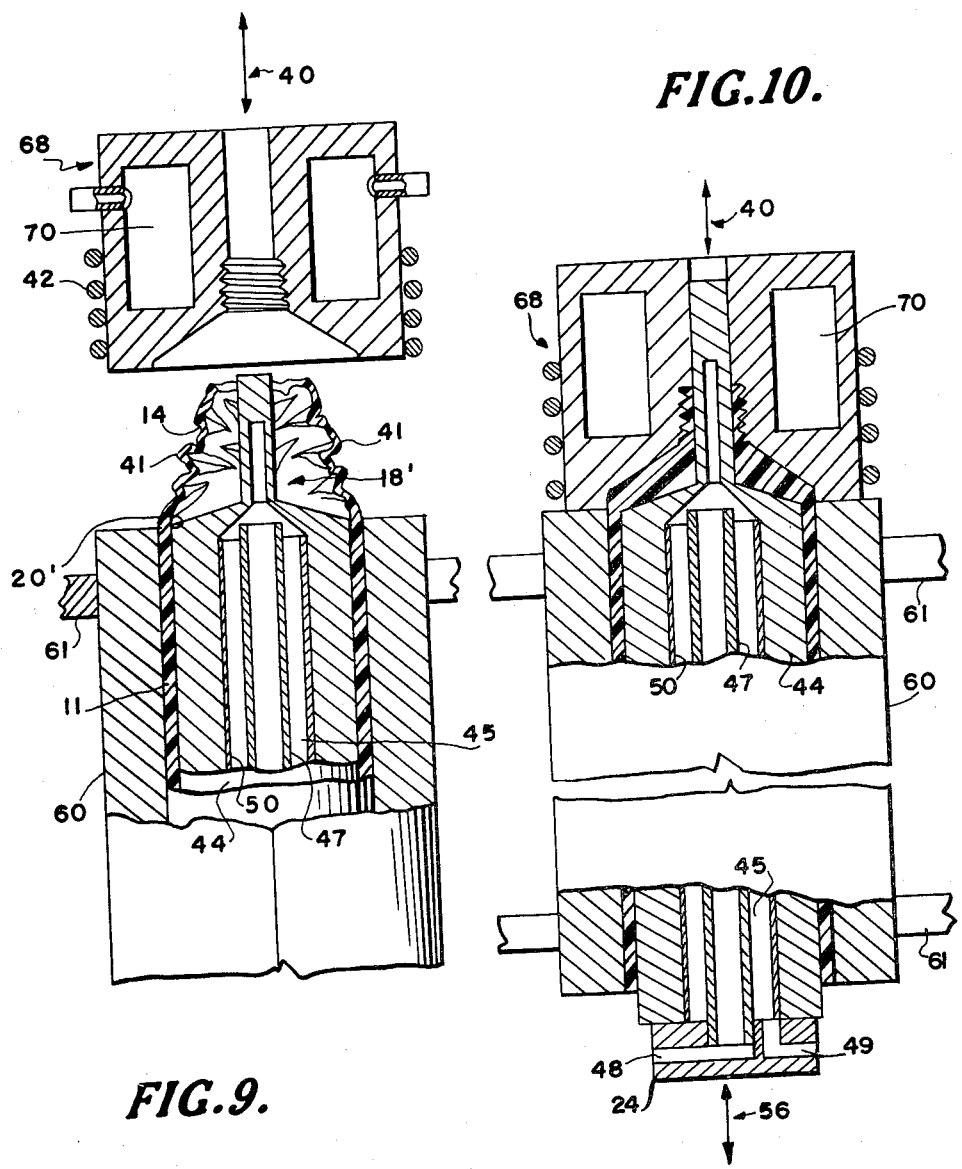

United States Patent Office 3,237,243
Patented Mar. 1, 1966

3,237,243
APPARATUS FOR MAKING
PLASTIC CONTAINERS
Robert W. Saumsiegle, Lexington, and Fred E. Wiley, Longmeadow, Mass., assignors to Thatcher Glass Manufacturing Company, Inc., New York, N.Y., a corporation of New York
Original application Sept. 11, 1961, Ser. No. 137,310. Divided and this application Apr. 27, 1962, Ser. No. 196,023
6 Claims. (Cl. 18—5)

This application is a division of my copending application, Serial No. 137,310, filed September 11, 1961.

This invention relates to the art of manufacture of seamless containers of thermoplastic material, e.g. of polyethylene, polyvinyl chloride, and vinylidene chloride polymers.

Seamless plastic squeeze containers, tubes or bottles, have been made in the past by methods involving premolding a head portion and then affixing the same on the end of a plastic cylinder forming the container body. Aside from the expense of the separate molding of the head portion, the technique is only difficultly performed to obtain a strong structure. For instance, joining the head and body requires a smooth uniform joint at the shoulder, the shoulder typically being the weak point of the final container. The present invention, provides apparatus for avoiding the inherent disadvantages of such prior art methods. The apparatus of the invention also has advantages over the prior art in that high pressure injection molding equipment is not required, and the entire finished container may be fabricated from one-piece plastic tubing.

It is therefore a primary object of this invention to provide an improved apparatus for molding a hollow plastic cylinder into a container having an integrally-formed shoulder and head portion. Another object is to provide apparatus for forming such a container with the integral head portion formed from an excess end of the plastic cylinder, the body being formed from the remainder thereof.

It is another object of the invention to provide apparatus for obtaining accurate geometrical application of heat in the molding of a hollow plastic cylinder into an integral container.

The apparatus of the present invention is employed by placing a hollow plastic cylinder on a mandrel having a body portion and a head forming end portion of diminishing cross section with an excess end portion of the cylinder extending beyond the body portion of the mandrel; imparting a telescoping movement between a crushing die and the mandrel, with pressure sufficient to collapse and crush the excess portion of the cylinder to conform somewhat to the contour of the head forming end of the mandrel and thereafter applying heat to the crushed excess end portion of the cylinder while telescoping a molding die thereover, to mold the same into a head integral with the body of the cylinder. The molding die may be the crushing die or a separate molding die may be emplaced after the crushing step is completed. During the molding step, the molding die, or the mandrel, or both are heated adjacent the crushed end portion to heat and soften the same and cause it to mold the shape established between the opposed surfaces of the mandrel and die.

The invention will be more fully understood by referring to the drawings in which:

FIGURE 6 is analogous to FIGURE 2 and illustrates the beginning of a crushing step of a second embodiment of the invention in which separate crushing and heating dies having short side walls are used;

FIGURE 7 is analogous to FIGURE 3 in illustrating the end of the crushing step of the embodiment of FIGURE 6;

FIGURE 8 shows a crushed plastic cylinder after the removal of the crushing die from the mandrel after the completion of the crushing step of FIGURE 7;

FIGURE 9 illustrates the movement of a heatable die over the mandrel and end-crushed cylinder of FIGURE 8, preliminary to the step of molding the head portion; and FIGURE 10 is analogous to FIGURE 4 and illustrates the manner in which the crushed cylinder of FIGURES 8 and 9 may be molded into a shoulder and head under the influence of heat and pressure.

Figure 1:
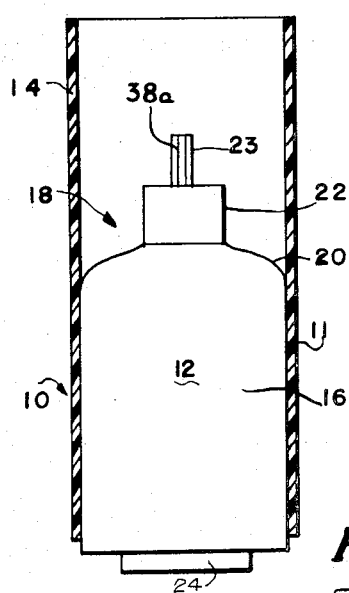
FIGURE 1 is an elevational view, partly in section, of a hollow plastic cylinder mounted on a mandrel and having an excess end portion extending beyond the same.

Referring to FIGURE 1 it will be seen that a hollow plastic cylinder 10, preferably an extruded tube, has been fitted tightly over a mandrel 12 such that an excess end portion 14 of cylinder extends beyond the upper, head-forming end of the mandrel 12. The mandrel has a body portion 16 and an upper end portion 18 contoured to the desired interior configuration of the shoulder and head of the completed plastic container. In the embodiment shown, the mandrel end 18 comprises a shoulder 20 and a head 22 having the configuration of the interior of the shoulder and cap-retaining head of a container, and a tip 23, for establishing an opening in the top of the finished container. The mandrel 12 is suitably supported at the bottom as by a support plate 24.

A movable die 26 is mounted above the mandrel 12 and comprises straight cylindrical side wall 28 and an end portion 30 which is contoured interiorly to the desired exterior configuration of the shoulder and head of the completed container. In the embodiment shown, the interior of the end portion 30 of the die has a shoulder portion 32 which determines the curvature of the shoulder of the container, a head portion 34 having internal threads 36 for forming the threads on the head of the container and a relief port 38. A layer of insulation 31 may be provided between the end portion 30 and the side wall 28. The inside diameter of the side wall 28 is at least the diameter of the mandrel plus twice the thickness of the wall of the plastic cylinder 10 so that the wall 28 may slidably engage the exterior of the cylinder.

Any suitable means, schematically shown as piston and cylinder 40, may be provided for imparting telescoping movement between the die 26 and the mandrel 12. The telescoping means may be operatively associated with either the die, or the mandrel, or with both and may also impart a relative rotational movement between the die and the mandrel. For example, a one quarter twist could be applied to either element.

Figure 2:
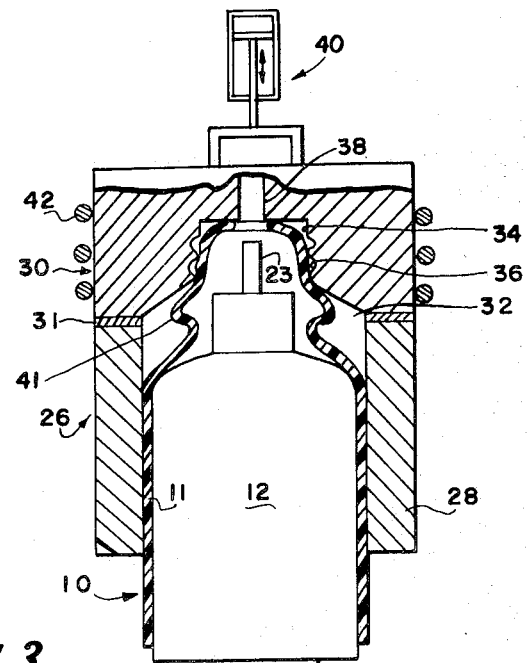
FIGURE 2 is an elevational view, partly in section, illustrating the beginning of a crushing step in which a die having elongated straight side walls is telescoped onto the mandrel and plastic cylinder to crush and/or fold the excess end of the plastic cylinder.
Figure 3:
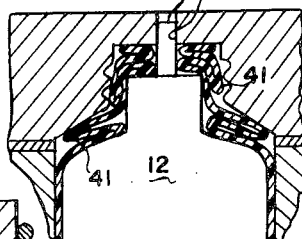
FIGURE 3 illustrates the end of the crushing step which was begun in FIGURE 2.
Figure 4:
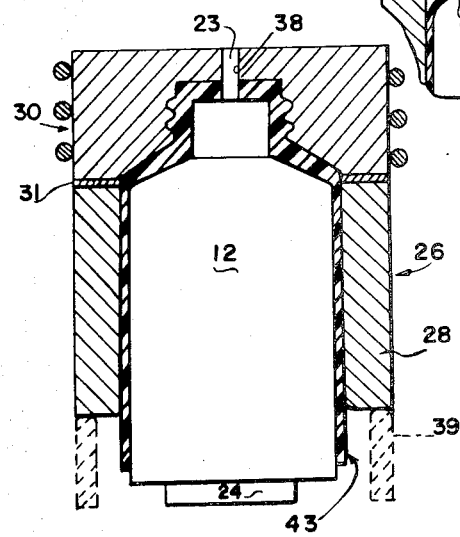
FIGURE 4 illustrates, in elevation, and partly in section, the molding of the crushed end of cylinder into an integral head member.

The end portion 30 of the die 26, shown in FIGURES 2-4, may be provided exteriorly with suitably, conventionally controlled alternating current induction heating coil 42, which may be permanently attached thereto, or may be a separate, movable unit which can be brought into position when desired. Alternatively, other heating means may also be employed, such as an electrical resistance heating coil or fluid heat exchanger passages in either the die or the mandrel.

As shown in dotted lines in FIGURE 4, a stop 39 may be provided, if desired, for butting engagement against the lower end wall portion 28 of die 26, to predetermine the closed position of the die and the head-forming space between the die and mandrel. Alternatively, a stop could be provided on the tip 23 of the mandrel for engagement with a boss adjacent relief port 38. However, a stop for the die 26 is not required in the present invention.

A second embodiment of the invention is illustrated in FIGURES 6-10. In FIGURE 6 it is seen that a hollow plastic cylinder 10 has been fitted over a mandrel 44 leaving as before an excess end portion 14 extending above the upper end of the mandrel.

The mandrel 44 has a cylindrical body portion 16', a shoulder 20' and a contoured head-forming end 18' functionally equivalent to those on the mandrel 12 illustrated in FIGURES 1-4. As shown, mandrel 44 has a configuration particularly suitable for forming a tube such as is used to contain toothpaste or ointment. Mandrel 44 is provided with a central bore 45 extending from its lower end and terminating in a chamber 46 at its upper end. An axial tube 47 communicates with the chamber 46, and, at its lower end, with conduit passage 48 in support 24. A second conduit passage 49 in support 24 is in communication with bore 45 at its lower end. Heat exchange fluid may be delivered from any suitable source (not shown) through the inlet tube 47, into the chamber 46, down through the bore 45, exiting via conduit 49, or vice versa. If desired, insulation 50 may be provided annularly in bore 45 along the entire length of the body of the mandrel, to limit heating by the fluid to the head-forming end. Alternatively, the interior walls of chamber 46 may be insulated to limit cooling by cold heat exchange fluid solely to the body portion of the mandrel. While the support 24 may be rigidly secured to a fixed frame, it is preferably associated with any suitable means, such as piston and cylinder 56, for reciprocal movement of mandrel 44, slightly upwardly and downwardly.

A movable crushing die 51 having a relatively short cylindrical side wall 52 is mounted axially above the mandrel 44 for telescoping closure thereupon. The interior surface of the die 51 has shoulder and head portions which are contoured generally to the desired shape of the shoulder and head on the finished container. Since the die 51 is used only for crushing the excess end portion 14 of the plastic cylinder, it need not have the exact contours of the finished article. For example, as seen in FIGURES 6 and 7, the die 51 has no threaded portion. As with die 26, die 51 may be attached to any suitable means, such as piston and cylinder 40, illustrated in FIGURE 6 merely by an arrow, for moving the die downwardly toward the mandrel, and optionally, rotatably relative thereto.

As shown in the embodiment of FIGURES 6-10, the plastic cylinder 10 may be supported laterally against buckling by a pair of opposed plates 60 cylindrically concave for tightly engaging at least a portion of the circumference of the plastic cylinder. These plates may be mounted on a pair of slidably supported arms 61, fixed against vertical displacement by a support member 62, and reciprocally movable for engaging and supporting the cylinder body, and for releasing the same.

In FIGURES 9 and 10, molding die 68 is contoured interiorly to the desired exterior contours of the head and shoulder of the finished containers. The die is provided exteriorly with an alternating current induction heating coil 42, and interiorly with a passage 70 for carrying a heat exchange fluid. Suitable means, such as the piston and cylinder of FIGURE 2, illustrated by arrow 40 in FIGURE 9, are provided for telescoping the die onto crushed end 14 and head-forming end 18' of mandrel 44.

In using the apparatus of FIGURES 1-4 plastic cylinder 10 is first forced over mandrel 12, manually or by machine, so as to leave a predetermined excess end portion 14 extending above the body portion 16 of the mandrel. In this position, the body 11 of the cylinder, shown in FIGURE 1, frictionally engages body portion 16 of the mandrel so as to maintain the cylinder in position. The necessary length of the excess end portion 14 is that which will supply at least sufficient material for forming the head of the completed article. As shown in FIGURE 1, the portion 14 extends beyond the head 22 of the mandrel. As will be understood, however, the portion 14 may, in some cases, extend only slightly beyond the top of the body portion 16, as when the head of the completed article is to be considerably smaller in diameter than the body. It is not necessary that the lower end of the cylinder engage a support, although a support for this purpose, removable between the crushing and molding operations, may be employed if desired. Die 26 is then placed telescopically over cylinder 10 and mandrel 12, the inner surface of the side wall 28 slidably engaging the exterior of the body 11 of cylinder 10, and the inner die surface crushing excess end portion 14 into a plurality of folds 41. As the downward movement of the die continues, excess end portion 14 is further crushed while the cylinder body 11 is laterally supported against buckling by engagement with the side wall portion 28 of the die. As indicated above, the crushed portion may be slightly twisted by rotating the die slightly during its crushing stroke assisting in a suitable folding of the plastic. The crushed and twisted plastic will, under some circumstances, be more readily molded.

When the resistance of the folds 41 to further crushing equals the downward force on the die, movement of the die ceases, as illustrated in FIGURE 3, although slight downward pressure on the die is maintained. The induction heating coil 42 is then energized to heat rapidly the end portion 30 of the die to a temperature which is at least as high as the softening temperature of the plastic of cylinder 10. The layer of insulation 31 between the end portion 30 and the side wall 28 prevents any substantial heating of the side wall and thereby prevents the plastic cylinder below the excess portion 14 from becoming heat-softened. This is desirable to avoid gravity induced flow, and wall weakening of the cylinder body. After application of heat to the die, the crushed plastic is softened, starting at those points which first contact the hot die surfaces, and the softened plastic flows and is molded under the influence of the die pressure. The telescoping movement of the die is rapidly completed with sufficient flow of the plastic material so that the latter substantially conforms to the interior contours of die portion 30 and mandrel end 18.

The molding step is terminated by halting the downward movement of the die 26 over the mandrel and plastic cylinder at a position which gives the desired thickness of the head and shoulder on the finished container. This final position of the die is preferably attained as a result of the resistance of the softened plastic to further compression and may be accomplished by preselecting the length of the excess end portion 14 of the plastic cylinder to supply just the proper amount of plastic for the desired thickness of the head and shoulder portions. Alternatively, the excess end portion 14 may be of greater length and excess plastic may be permitted to flash from the die through the relief port 38 in the die. To accomplish this, a small longitudinal vent 38a (FIGURE 1) can be formed in tip 23, producing a small, and accurately sized, clearance between the tip and the wall of relief port 38. Under conditions of constant die pressure and temperature, it has been found that as the die continues to close, the shearing stresses necessary to extrude the softened plastic through the vent are a function of the thickness of the molded head and shoulder. As this thickness decreases to the desired dimension, there is no longer enough die pressure available for shear flow to force the material through the vent. It is therefore possible to mold the head and shoulder portions of desired thickness by providing the proper balance between vent size, die pressure, and temperature. In addition to these methods for determining the final position of the die, a stop located to engage the die at a predetermined position may be employed to limit the downward movement of the die and thus aid in producing the desired thickness of the head and shoulder portions. As indicated previously, a stop such as 39 in FIGURE 4 may be positioned to engage the side wall 28 or a stop may be provided on the tip 23 of the mandrel for engagement with the lower peripheral face of relief port 38.

Figure 5:
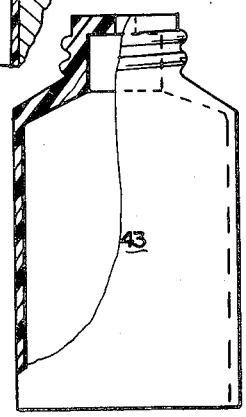
FIGURE 5 is an elevational view, partly in section, of a finished container having an integral head portion in accordance with one embodiment of the invention.

After the shoulder and head have been molded integrally with cylinder 10 to form the completed bottle 43, heating is stopped and die portion 30 and mandrel 12, which may have become warm during the molding step, are permitted to cool in order to set the softened plastic. The molded cylinder is held in die 26 by screw threads 36 so that as the die 26 is raised, the completed container, bottle 43 of FIGURE 5, is withdrawn from the mandrel 12. The die 26 can be used to transfer the bottle 43 to the next operation, such as a printing operation, in which the die 26 lowers the bottle 43 over the mandrel of a printing machine. For instance, such a mandrel could have a serrated surface on its upper end so that when the bottle 43 is pressed on the mandrel, the serrated surface frictionally grips the interior of the bottle 43. Rotation of the mandrel would then unscrew the bottle 43 from screw threads 36 in die 26 which is then ready to repeat its crushing and molding functions while the bottle 43 is being printed.

In the operation of the apparatus of FIGURES 6–10 the plastic cylinder 10 is first placed on the mandrel 44 manually or by a machine, frictionally engaging the body portion 16' of the mandrel with an excess end portion 14 extending above the body portion 16' of the mandrel. The plates 60 are then horizontally moved into engagement with body portion 11, cylinder 10 laterally supporting the same and holding the cylinder agaisnt vertical displacement during the subsequent crushing and molding steps. Excess end portion 14 is then crushed into a plurality of folds 41 by forcing crushing die 51 downwardly over the head-forming end 18' of the mandrel. In FIGURE 6, the plates 60 are shown approaching the cylinder and mandrel while the crushing die 51 is beginning its downward stroke. The crushing step is completed, as seen in FIGURE 7, when the bottom of the side wall 52 of the die engages the top of the plates 60, thereby ceasing its downward movement. Alternatively, the inherent resistance of the folds 41 to further crushing may be utilized to halt the die before it reaches the plates, as described hereinabove. In any event, the crushing die 51 is then withdrawn, leaving, as seen in FIGURE 8, the crushed end portion exposed above the top of plates 60 which continue to engage body portion 11 of cylinder 10.

The molding step of the embodiment of FIGURES 6–10 is now accomplished by telescoping molding die 68 and the mandrel 44 together and simultaneously heat-softening the crushed plastic end. Heat may be supplied by induction heating coil 42 or by passing steam or other heat exchange fluid through the passage 70 in the molding die. Additionally, heat may be supplied by passing a heated fluid through the tube 47 into the chamber 46 in the mandrel 44. In either case, the application of heat to the plastic is localized at those die and mandrel surfaces which are adjacent the crushed end portion which forms the head, while avoiding heat-softening of the body 11 of the plastic cylinder 10, e.g. that part below the shoulder portion 20' of the mandrel. The plates 60 normally remain relatively cool during the molding operation, but they may be cooled by any suitable means if necessary.

Since it is desirable to complete the molding step as rapidly as possible, the heating die 68 should be heated as rapidly as possible and may be preheated before it makes contact with the crushed plastic. The extent of preheating, however, is limited by a tendency for the softened plastic to flash between the die and the top of the plates 60 during the downward movement of the die 68. Therefore, while some preheating of the die is desirable for decreasing the molding time, continued heating after the die completes its downward movement is generally necessary.

There is also a tendency for softened plastic to flash between the die and the top of the plates 60 if high molding pressure is developed just before the die closes on the plates. This is objectionable because the die may not close completely giving an unpredictable thickness of the head and shoulder on the container as well as a flash ring on the container wall. In the preferred molding method, this undesirable flashing is avoided by closing the die 68, either partially preheated or cold, on the plates 60 without creating substantial internal molding pressure, by then further heating the die and forcing the mandrel 44 slightly upwardly through the plastic cylinder 10 to effect the necessary molding pressure. To accomplish this sequence of steps, the length of the excess end portion 14 of the plastic cylinder 10, should be preselected, so that the die may be closed on the plates without creating molding pressure. Where there is little tendency for flashing of softened plastic between the die 68 and the top of the plates 60, and in this case the molding pressure may be effected by maintaining the mandrel in a fixed position and by preselecting a length of the excess portion which will give the required molding pressure when the die is moved into contact with the plates.

After the head and shoulder have been molded on the plastic cylinder body 11, heating is discontinued, molding pressure is released, and the molded heat-softened plastic is set by cooling. Heat may be readily removed from the head by passing cold water or other cold fluid through passage 70 in the die and bore 45, chamber 46 and tube 47 in the mandrel. After the die and the plates have been withdrawn, the finished container may be removed from the mandrel by the operations described above with respect to the embodiment of FIGURES 1–4.

It should be understood that in the molding apparatus of the present invention the rapid and geometrically localized heating of the crushed end portion only of the plastic cylinder 10 is important, and the particular source of heat and the element heated is relatively unimportant. Thus, the shoulder and head portions of either or both the die and mandrel may be heated during the molding operation by any of a variety of methods so long as precautions are taken to avoid heating the plastic cylinder below the point at which the shoulder is to be molded. Induction heating, heating with internal fluids, electrical resistance heating and high frequency dielectric heating may be applied as desired to the die or mandrel or both. When the latter method is employed, it is necessary to select suitable dielectric materials for the die or mandrel. It is also contemplated that in some instances the crushed plastic may be heated directly with the use of high frequency induction currents. Precautions for avoiding the heat-softening of the body of the cylinder below the crushed portion include rapid and proper heating cycles, proper insulation, and appropriate cooling, when necessary.

It will be understood that the specific embodiments described above are not definitive of the scope of the invention which is limited only by the following claims.

What is claimed is:

1. Apparatus for forming a circumferential end portion of a hollow plastic cylinder of thermoplastic material into a desired configuration comprising: a mandrel having a body portion, a shoulder portion and a head-forming portion of reduced cross-section, said body portion being adapted to engage the inner circumference of the plastic cylinder; a die mounted axially with said mandrel and having a cavity therein, said cavity having contours generally complementary to the exterior contours of the body, shoulder and head-forming portion of said mandrel, said cavity at its open end being defined by a cylindrical side wall having a cylindrical inner surface of a diameter at least that of the body portion of said mandrel plus twice the wall thickness of the plastic cylinder, said cylindrical inner surface extending to the shoulder contour of said die; means for imparting relative telescoping movement between said die and said mandrel; insulating means at the shoulder contour of said cavity, said insulating means being disposed between the cylindrical side wall of said die and the remainder of said die; and heating means for heating said remainder of said die whereby only the space defined by the exterior of the head portion of said mandrel and the end portion of the cavity in said die is heated.

2. Apparatus as in claim 1 wherein the head-forming portion of said mandrel terminates in an axially extending tip having a longitudinal groove in its exterior surface and wherein said die has an axial aperture therethrough for receiving said tip, said groove and the opposed portion of the wall of said aperture defining a relief port which permits flashing of molten plastic when said mandrel and die are telescoped together.

3. Appartus for forming a circumferential end portion of a hollow plastic cylinder of thermoplastic material into a desired configuration comprising: a mandrel having a body portion, a shoulder portion and a head-forming portion of reduced cross-section, said body portion being adapted to engage the inner circumference of the plastic cylinder; a die mounted axially with said mandrel and having a cavity therein, said cavity having contours generally complementary to the exterior contours of the body, shoulder and head-forming portions of said mandrel; lateral support means for engaging an exterior circumferential portion of a plastic cylinder on said mandrel, the head-forming portion of said mandrel extending axially beyond said lateral support means whereby said support means serves also as a stop for engagement with the end of the cylindrical wall of said die thereby limiting telescoping movement between said mandrel and die; and means for effecting telescopic movement between said lateral support means and said mandrel whereby after said die and lateral support means have engaged each other, additional telescoping movement between said die and mandrel may be effected.

4. Appartaus as in claim 3 wherein said lateral support means is fixed against axial movement relative to said mandrel and further including means for moving said mandrel axially relative to said lateral support means whereby after said die and lateral support means have engaged each other additional telescoping movement between said die and mandrel may be effected.

5. Apparatus as in claim 3 wherein said lateral support means terminates at the shoulder contour of said mandrel.

6. Apparatus for forming a circumferential end portion of a hollow plastic cylinder of thermoplastic material into a desired configuration comprising: a mandrel having a body portion, a shoulder portion and a head-forming portion of reduced cross-section, said body portion being adapted to engage the inner circumference of the plastic cylinder; a die mounted axially with said mandrel and having a cavity therein, said cavity having contours generally complementary to the exterior contours of the body, shoulder and head-forming portions of said mandrel, said cavity at its open end being defined by a side wall having a cylindrical inner surface of a diameter at least that of the body portion of said mandrel plus twice the wall thickness of the plastic cylinder; lateral support means for engaging an exterior circumferential portion of a plastic cylinder on said mandrel, said support means including a pair of opposed, cylindrically concave plates movable toward and away from said mandrel in a lateral direction, said plates terminating at the shoulder contour of said mandrel so that the head-forming portion of said mandrel extends axially beyond said plates; means for imparting relative telescoping movement between said die and said lateral support means, the latter acting as a stop to limit movement toward each other; and means for effecting relative axial movement between said mandrel and said die after said die is in engagement with said lateral support means.

References Cited by the Examiner
UNITED STATES PATENTS

| | | | |
|---|---|---|---|
| 2,315,770 | 4/1943 | Cleveland | 18—18 |
| 2,418,155 | 4/1947 | Bogoslowsky. | |
| 2,702,408 | 2/1955 | Hartland. | |
| 2,788,544 | 4/1957 | Voumard et al. | 18—19 |
| 2,900,665 | 8/1959 | Walker | 18—19 |
| 2,928,125 | 3/1960 | Smucker et al. | 18—30 |
| 2,958,898 | 11/1960 | Voumard et al. | |

WILLIAM J. STEPHENSON, *Primary Examiner.*